(12) United States Patent
Laaksonen et al.

(10) Patent No.: US 7,689,257 B2
(45) Date of Patent: Mar. 30, 2010

(54) SUPPORT STRUCTURE FOR PORTABLE ELECTRONIC DEVICE

(75) Inventors: Juha Laaksonen, Paimio (FI); Mikko Hinkkanen, Turku (FI)

(73) Assignee: Nokia Corporation, Espoo (FI)

( * ) Notice: Subject to any disclaimer, the term of this patent is extended or adjusted under 35 U.S.C. 154(b) by 463 days.

(21) Appl. No.: 11/600,423

(22) Filed: Nov. 16, 2006

(65) Prior Publication Data

US 2008/0117570 A1 May 22, 2008

(51) Int. Cl.
*H04M 1/00* (2006.01)
(52) U.S. Cl. ............... 455/575.1; 455/575.3; 455/575.4
(58) Field of Classification Search .............. 455/575.1, 455/575.3, 575.4, 90.1, 90.3, 557, 556.1, 455/347; 361/680, 755; 379/433.06, 433.07; 341/20, 22, 23
See application file for complete search history.

(56) References Cited

U.S. PATENT DOCUMENTS

| | | | |
|---|---|---|---|
| 2002/0128053 A1 | 9/2002 | Jung | 455/575 |
| 2004/0203513 A1* | 10/2004 | Kwon | 455/90.3 |
| 2005/0026658 A1* | 2/2005 | Soejima | 455/575.1 |
| 2006/0139898 A1 | 6/2006 | Takei | 361/755 |

* cited by examiner

*Primary Examiner*—Jean A Gelin
(74) *Attorney, Agent, or Firm*—Harrington & Smith

(57) ABSTRACT

Disclosed herein are structures for supporting a clamshell- or slider-type portable electronic device such as a notebook computer; personal digital assistant; or wireless telephone. The clamshell- and slider-type portable electronic devices typically have at least two assemblies—a first housing assembly, and a second housing assembly containing at least a keyboard. In a clamshell-type electronic device, the first housing assembly and second housing assembly are connected by a hinge and pivot between at least an open position and a closed position. In a slider-type electronic device, the first housing assembly and second housing assembly are connected by a slide connection and slide between at least an open position and a closed position. In portable electronic devices made in accordance with the invention, the keyboard is comprised of a first set of keys and a second set of keys. The keys comprising the first and second sets have touch surfaces configured to receive keystrokes. The touch surfaces of the first set of keys extend above the touch surfaces of the second set of keys. When a portable electronic device having either the clamshell- or slider-type configuration is in a closed position, the combination of the varying heights of the touch surfaces of the keys and cooperating structures in the first and second housings hinders relative movement between the first and second housing assemblies when an external force (for example, due to an accidental drop) is applied to the portable electronic device. The hindering of relative movement helps to protect the portable electronic device from damage.

40 Claims, 4 Drawing Sheets

SUPPORT STRUCTURE FOR PORTABLE ELECTRONIC DEVICE

TECHNICAL FIELD

The invention generally concerns portable electronic devices having keyboards or keypads, and more particularly concerns clamshell- and slider-type portable electronic devices where keys comprising the keyboard or keypad of the device are configured to support the portable electronic device when the device is closed, particularly when the portable electronic device is accidentally dropped.

BACKGROUND

Portable electronic devices (for example, notebook computers; personal digital assistants; handheld computers; cellular telephones; etc.) often have clamshell- or slider-type configurations. In a clamshell configuration, two halves comprising the portable electronic device are joined by a hinge on a common side. The two halves are configured to pivot about the hinge during opening and closing operations. The clamshell configuration has advantages. In particular, when a portable electronic device having a clamshell configuration is closed, the display and keyboard are hidden from view and protected by the housing.

This is in contrast to a so-called "monoblock" (candybar) configuration where the display and keyboard are mounted in a unitary housing and exposed at all times. In such a configuration the display is vulnerable to scratching, and the keyboard vulnerable to contamination by, for example, liquids.

In a portable electronic device having a slider configuration, the two halves comprising the device are connected by a slider connection that permits relative movement between the halves from an open position to a closed position. In a slider-type portable electronic device, the display is typically exposed at all times, and the keyboard is hidden from view when the device is in the closed position. Such a configuration protects the keyboard from damage when the portable electronic device is not in use.

Conventional portable electronic devices having clamshell- and slider-type configurations have been found in some instances to be susceptible to damage when dropped. Often, dropping the portable electronic devices causes bending or twisting of one or both of the halves comprising the portable electronic device. The bending or twisting can be particularly harmful to fragile electronic parts comprising the portable electronic devices such as, for example, the display.

Accordingly, those skilled in the art seek improved structures for supporting a clamshell- or slider-type portable electronic device, particularly structures that significantly reduce the risk of damage to the device when the device is dropped, or exposed to other accident situations where external forces are applied to the device.

SUMMARY OF THE PREFERRED EMBODIMENTS

The foregoing and other problems are overcome, and other advantages are realized, in accordance with the following embodiments of the invention.

A first embodiment of the invention is a portable electronic device comprising: a first housing assembly; a second housing assembly comprising at least a keyboard, the keyboard comprising at least a first set of keys and at least one second key, the keys comprising the first set and the at least one second key each having touch surfaces configured to receive keystrokes, the touch surfaces of the first set of keys extending above the touch surface of the at least one second key; a connection mechanism connecting the first housing assembly with the second housing assembly, the connection mechanism configured to permit relative movement between the first and second housing assemblies from at least an open position to a closed position; and wherein when the portable electronic device is in at least the closed position, the touch surfaces of the first set of keys and the at least one second key in combination with the first and second housing assemblies are configured to hinder movement of at least one of the first or second housing assemblies when an external force is applied to the portable electronic device. The hindering of movement serves to protect the portable electronic device from twisting and bending caused by the external force.

A second embodiment of the invention is a portable electronic device comprising: a first housing assembly comprising at least a display and a display surround, the display and display surround each having surfaces, the surface of the display displaced inward from the surface of the display surround forming a display recess; a second housing assembly comprising at least a keyboard, the keyboard comprising a first set of keys and a second set of keys, the keys comprising the first and second set of keys each having touch surfaces configured to receive keystrokes, the touch surfaces of the first set of keys extending above the touch surfaces of the second set of keys; a hinge connecting the first housing assembly and the second housing assembly, the hinge configured to permit relative movement between the first and second housing assemblies from at least an open position to a closed position; and wherein when the portable electronic device is in at least the closed position the first and second sets of keys in combination with the first and second housing assemblies are configured to hinder movement of at least one of the first and second housing assemblies when an external force is applied to the portable electronic device.

A third embodiment of the invention is a portable electronic device comprising: a first housing assembly; a second housing assembly comprising at least a keyboard, the keyboard comprising a first set of keys and a second set of keys, the keys comprising the first and second set of keys each having touch surfaces configured to receive keystrokes, the touch surfaces of the first set of keys extending above the touch surfaces of the second set of keys; a slide connecting the first housing assembly and the second housing assembly, the slide configured to permit sliding relative movement between the first housing assembly and the second housing assembly from at least an open position to a closed position; and wherein when the portable electronic device is in at least the closed position the first and second sets of keys in combination with the first and second housing assemblies are configured to hinder movement of at least one of the first and second housing assemblies when an external force is applied to the portable electronic device.

A fourth embodiment of the invention is a portable electronic device comprising: a first housing assembly comprising at least a display and a display surround; a second housing assembly comprising at least a keyboard, the keyboard comprising a first set of keys and a second set of keys, the first and second sets of keys having touch surfaces adapted to receive keystrokes; a hinge connecting the first housing assembly and the second housing assembly, the hinge configured to permit relative motion between the first and second housing assemblies from at least an open position to a closed position; and wherein when the portable electronic device is in at least the closed position the touch surfaces of the first set of keys directly face the display and the touch surfaces of the second set of keys directly face the display surround, the touch surfaces of the first set of keys directly facing the display displaced a first distance from the display and the touch surfaces of the second set of keys directly facing the display surround displaced a second distance from the display surround, the first distance less than the second distance, and wherein the first and second sets of keys and the first and second housings are configured to hinder movement of at least one of the first and second housings when an external force is applied to the portable electronic device.

In conclusion, the foregoing summary of the embodiments of the present invention is exemplary and non-limiting. For example, one of ordinary skill in the art will understand that one or more aspects from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
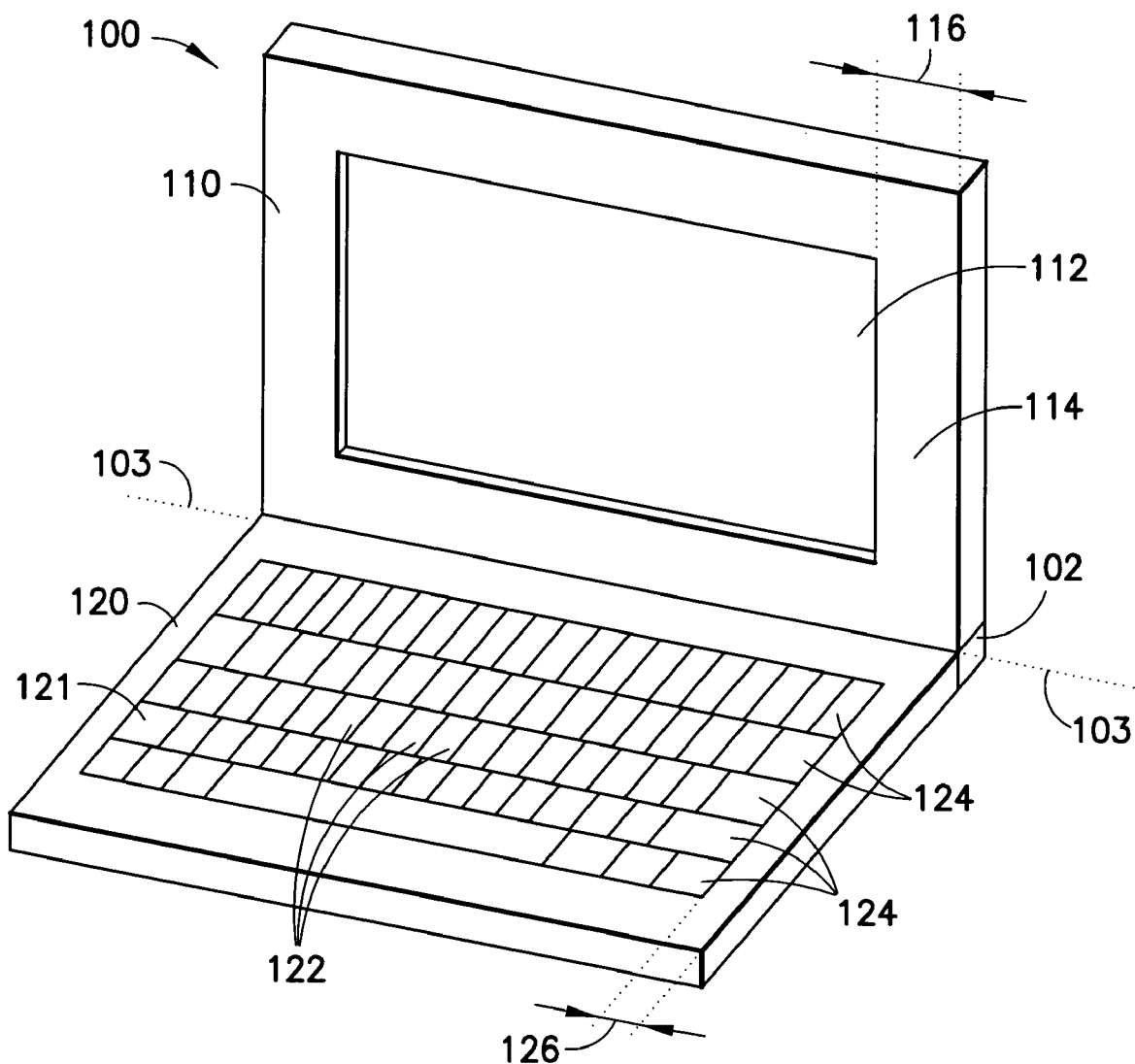
FIG. 1 depicts a notebook computer in which the invention may be practiced.

FIG. 1 depicts a portable electronic device (in this case, a notebook computer) 100 in which the structures of the invention may be practiced. The portable electronic device 100 comprises a first housing assembly 110 and a second housing assembly 120. Positioned in the first housing assembly is a display 112. A region of the first housing assembly surrounding the display 112 is known as the display surround 114. The second housing assembly 120 comprises at least a keyboard 121. The keyboard 121 comprises a first set of keys 122 located in the interior of the keyboard and a second set of keys 124 located on the edges of the keyboard. As is seen from FIG. 1 a distance 116 from an edge of the display 112 to an edge of the first housing assembly is wider than a distance 126 from an edge of the keyboard 121 to an edge of the second housing assembly 120. The first housing assembly 110 and second housing assembly 120 both swing about a hinge 102 from an open position to a closed position. The hinge 102 is coincident with axis 103. When in the closed position, keys 124 comprising the second set of keys located on the edge of the keyboard 121 directly face the display surround 114, and keys 122 comprising the first set of keys directly face the display 112. Although the invention may be practiced in notebook computers and other portable electronic devices having a clamshell configuration as depicted in FIG. 1, one skilled in the art will understand the invention may be practiced in portable electronic devices having a slider configuration and differing in other ways from the portable electronic device 100 depicted in FIG. 1.

Figure 2:
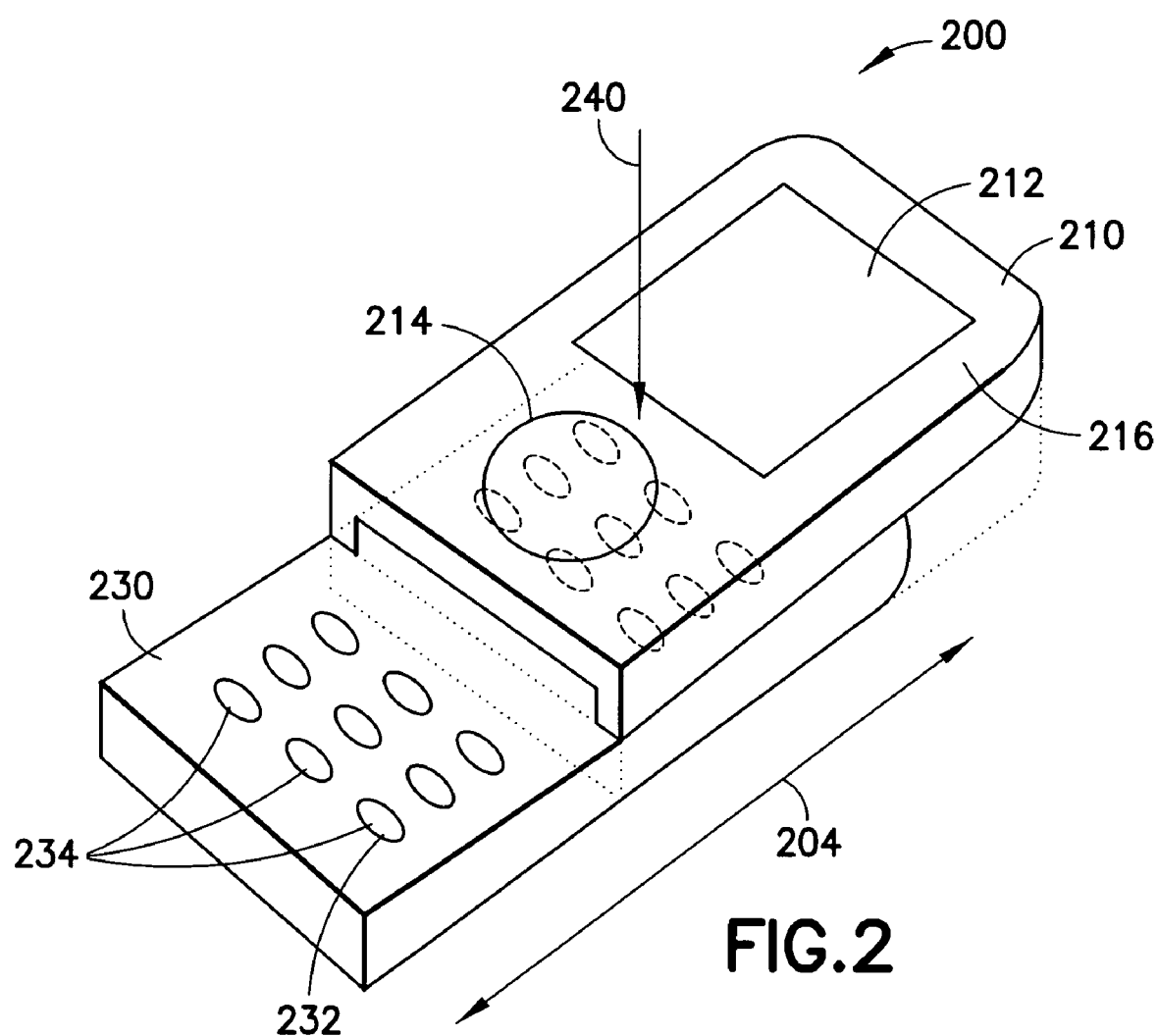
FIG. 2 depicts a slider-type portable electronic device in which the invention may be practiced.

For example, FIG. 2 depicts another portable electronic device in which the invention may be practiced. In contrast to the notebook computer 100 depicted in FIG. 1, the portable electronic device depicted in FIG. 2 has a slider configuration. The portable electronic device depicted in FIG. 2 has a first housing assembly 210 and a second housing assembly 230. The first housing assembly comprises a display 212 and a control 214, and the second housing assembly 230 comprises at least a keypad 232 comprised of keys 234. The first and second housing assemblies 210, 230 are configured for relative sliding movement between an open position and a closed position. The portable electronic device 200 depicted in FIG. 2 is shown both in the open position where the keypad is visible 232, and in a ghost closed position where the keypad 232 is represented by a broken line.

Within the context of the invention "keyboard" and "keypad" are used interchangeably, and the invention encompasses both portable electronic devices having keyboards and portable electronic devices having keypads.

Conventional portable electronic devices often bend and twist when subjected to an external force. For example, in the notebook computer 100 depicted in FIG. 1 when an external force is applied to the outside of the first housing assembly when the notebook computer is in a closed position, the external force pushes the display and surrounding structure downward. These forces may twist or bend the display, damaging the display. Likewise in the portable electronic device 200 depicted in FIG. 2, a force 240 applied to the outside surface 216 of the first housing assembly 210 may deform or twist the first housing assembly 210, damaging fragile electronics contained in the portable electronic device 200. Thus, those skilled in the art seek structures that hinder or prevent twisting and bending of portable electronic devices having clamshell and slider configurations when the portable electronic devices are subjected to an external force.

Figure 3:
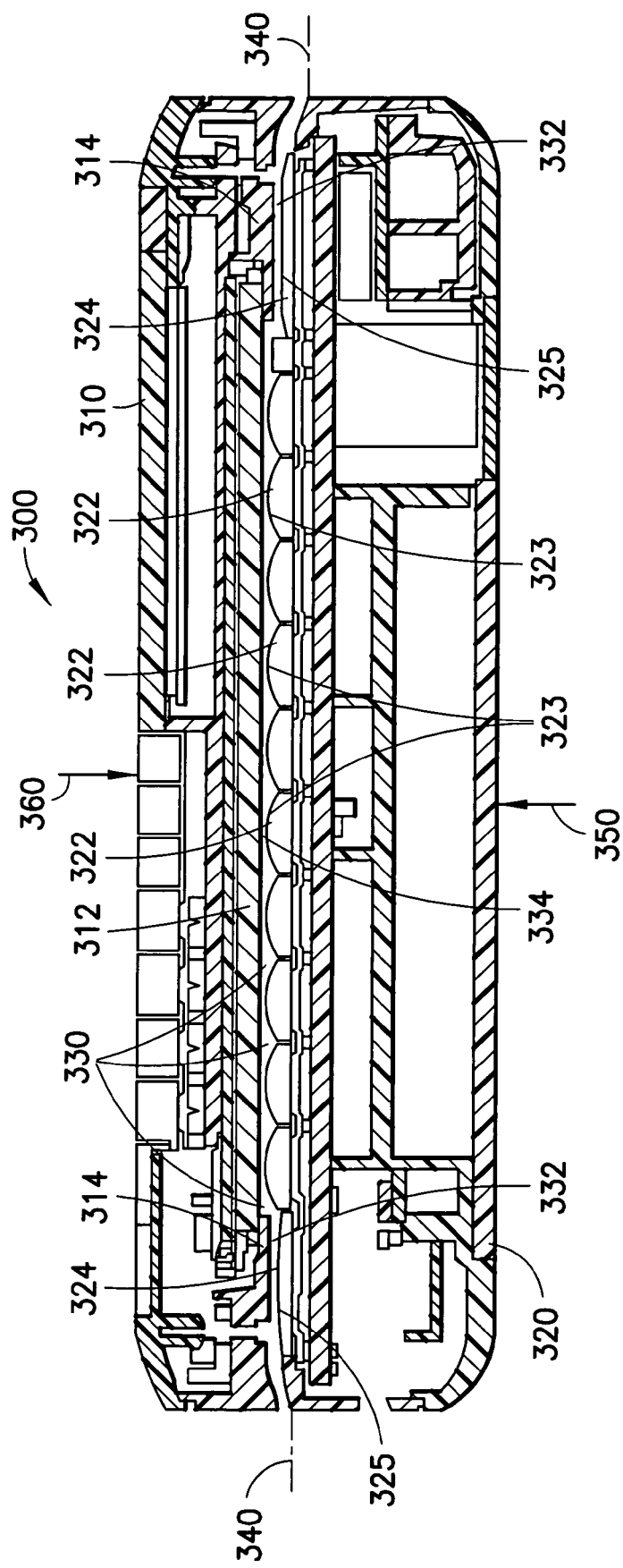
FIG. 3 is a cross-sectional view depicting a portable electronic device made in accordance with the invention.

FIG. 3 depicts a portable electronic device 300 made in accordance with the invention that overcomes the limitations of the prior art. The portable electronic device 300 comprises a first housing assembly 310 and a second housing assembly 320. The second housing assembly further comprises keys 322 comprising a first set of keys and keys 324 comprising a second set of keys. In the embodiment depicted in FIG. 3, keys 322 from the first set have touch surfaces 323 that extend vertically higher than the touch surfaces 325 of keys 324 from the second set. Portions of the first housing assembly also have been reduced in vertical cross section. The end result of these modifications reduces the gap 334 between keys 322 of the first set and the display 312 to the point where it is less than the gap 332 between the keys 324 of the second set and the display surround 314. Thus, when the portable electronic device 300 is dropped and an external force 350 is applied to the second housing assembly 320 or items are piled on top of the portable electronic device 300 applying an external force 360 to the first housing assembly 310, the display 312 will contact the keys 322 of the first set before the keys 324 of the second set engage the display surround 314. This prevents significant bending or twisting of the first housing assembly 310 or the second housing assembly 320, protecting fragile electronics like the display. In other words, the keys of the first and second sets are configured to work in combination with coordinate structures (such as display 312 and display surround 314) of the first and second housing assemblies 310, 320 to hinder relative movement (such as bending or twisting) between the first and second housing assemblies. This reduces the probability of damage, and in turn reduces the likelihood that the portable electronic device 300 will have to be repaired or replaced.

In the embodiment depicted in FIG. 3, this is accomplished, as indicated, by reducing the cross section of the keys 324 of the second set and display surround 314 to the point where the display 312 can be positioned very close to the keys 322 of the second set when the portable electronic device 300 is closed. Also apparent in FIG. 3, at least a portion of the keys 322 of the first set extends into a display recess 330 formed by the display 312 and display surround 314. In addition, the gap 332 between the keys 324 of the second set and the display surround 314 is at least substantially equal to, and preferably greater than, the gap 334 between the display 312 and the keys 322 of the first set.

In summary, the combination of keys 322, 324 having touch surfaces 323, 325 displaced with respect to each other and coordinate structures of the first and second housing assemblies (for example, 312 and 314) serves to protect portable electronic device 300 from forces 350, 360 applied substantially perpendicular to the axis of rotation 340 of a hinge (not shown) of portable electronic device 300. It also protects the portable electronic device from other forces having a component perpendicular to the axis 340.

Although the structures depicted in FIG. 3 were described with reference to a clamshell-type portable electronic device 300, a similar combination can be used in a portable electronic device having a slider configuration. In such a configuration, the first housing assembly 310 and second housing assembly 320 would not be configured for relative pivotal movement about axis 340 from at least an open position to a closed position but instead would slide with respect to one another (for reference in a direction perpendicular to the page bearing the figure) from an open position to a closed position in a manner similar to that depicted in FIG. 2. Again, the combination of the displaced key surfaces and coordinate structures would protect the portable electronic device from twisting and bending caused by forces having a component roughly perpendicular to the sliding direction of the first and second housing assemblies 310, 320.

Figure 4:
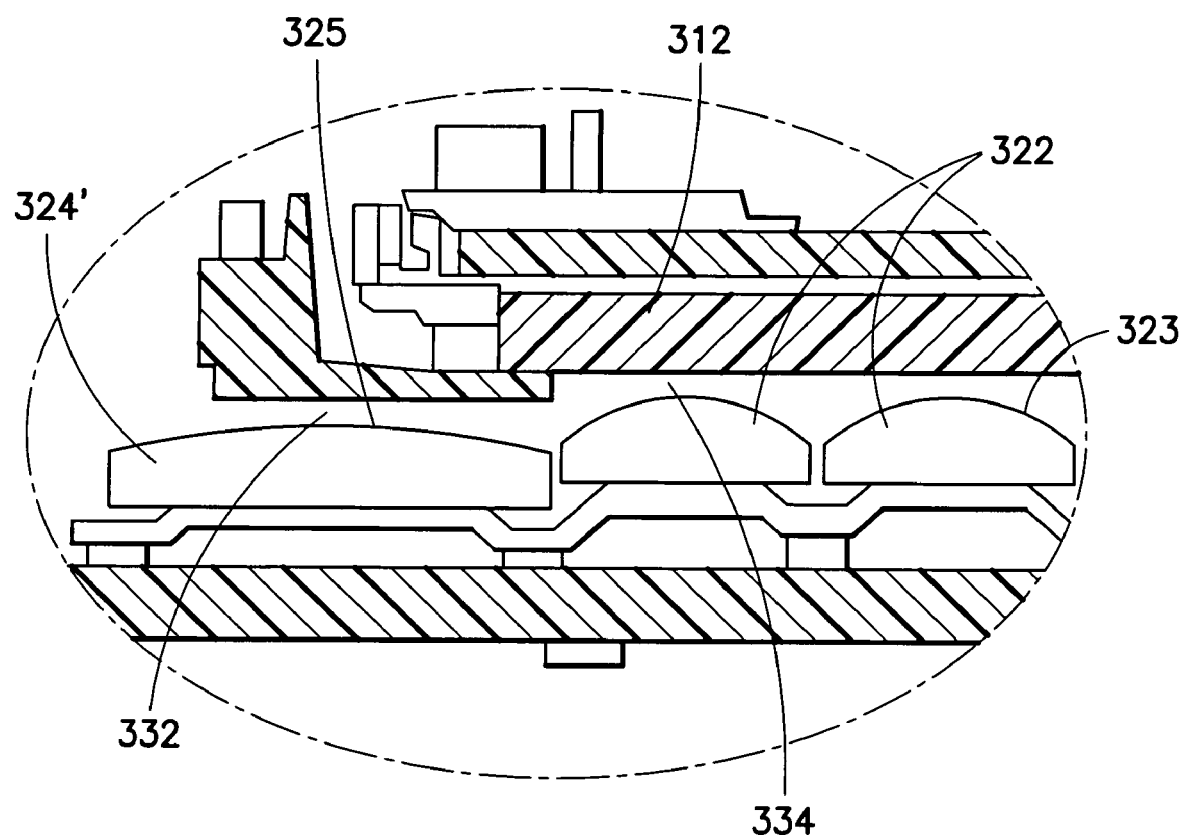
FIG. 4 is a cross-sectional view depicting a portion of a portable electronic device made in accordance with the invention.

The spacing depicted in FIG. 3 can be accomplished in other ways. For example, as shown in FIG. 4, a key 324' of the second set can be of the same cross-sectional height as keys 322 of the first set, but the key 324' of the second set can be mounted in a recess, so that the gap 332 between the key 324' of the second set and the display surround 314 is at least equal to, and preferably greater than, the gap 334 between the keys 322 of the first set and the display 312. Further, one skilled in the art will understand that proper spacing can be accomplished when the surfaces of the display 312 and display surround 314 are flush with one another.

In addition, one skilled in the art will understand that the invention encompasses portable electronic devices where keys of the first and second sets and coordinate structures in the housing assemblies (such as, for example, the display and display surround) are configured so that protection from external forces is provided not only when the portable electronic device is in a closed position, but also when the portable electronic device is in a partially closed position. For example, in the portable electronic device depicted in FIG. 2, one skilled in the art will understand that the keys 234 and coordinate structures of the first housing assembly 210 can be designed so that the keys and coordinate structures begin to align when the portable electronic device 200 is in a partially closed position, thus providing protection from external forces when the device is dropped or heavy objects are placed on the device. Such alignment would be of the type depicted in the device of FIG. 3 modified as described previously to have a slider connection extending into the page. In such a device the display and display surround would be replaced by other structures since the inside of the first housing assembly is not visible. Nonetheless, such structures replacing the display and display surround would be configured to operate in a similar manner with keys of the first and second sets, thus providing protection from external forces. In such a slider device, the cross-sectional view depicted in FIG. 3 could correspond not only to a fully closed position, but also to a partially closed position. One skilled in the art will understand that similar protection can be achieved in a portable electronic device with a clamshell configuration when the device is in a partially closed position, for example, when the device is left unlatched. In an unlatched position, the keys of a clamshell-type device made in accordance with the present invention would work in the same manner as in the closed position when a heavy object, for example, is placed on top of the partially closed clamshell-type device.

Thus it is seen that the foregoing description has provided by way of exemplary and non-limiting examples a full and informative description of the best methods and apparatus presently contemplated by the inventors for implementing an improved support structure for portable electronic devices. One skilled in the art will appreciate that the various embodiments described herein can be practiced individually; in combination with one or more other embodiments described herein; or in combination with portable electronic devices differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A portable electronic device comprising:
   a first housing assembly;
   a second housing assembly comprising at least a keyboard, the keyboard comprising at least a first set of keys and at least one second key, the keys comprising the first set and the at least one second key each having touch surfaces configured to receive keystrokes, the touch surfaces of the first set of keys extending above the touch surface of the at least one second key;
   a connection mechanism connecting the first housing assembly with the second housing assembly, the connection mechanism configured to permit relative movement between the first and second housing assemblies from at least an open position to a closed position; and
   wherein when the portable electronic device is in at least the closed position, the touch surfaces of the first set of keys and the at least one second key in combination with the first and second housing assemblies are configured to hinder movement of at least one of the first or second housing assemblies when an external force is applied to the portable electronic device.

2. The portable electronic device of claim 1 wherein the connection mechanism is a hinge configured to permit pivotal movement of the first and second housing assemblies from the open position to the closed position.

3. The portable electronic device of claim 2 wherein the first housing assembly further comprises a display and a display surround, the display and display surround each having surfaces, the surface of the display displaced inward from the surface of the display surround forming a display recess.

4. The portable electronic device of claim 3 wherein the touch surfaces of the first set of keys extend into the display recess when the portable electronic device is in the closed position.

5. The portable electronic device of claim 2 wherein when the portable electronic device is in at least the closed position, the touch surfaces of the first set of keys and the at least one second key in combination with the first and second housing assemblies are configured to hinder movement of at least one of the first or second housing assemblies when an external force is applied to the portable electronic device at an angle substantially perpendicular to an axis coincident with the hinge.

6. The portable electronic device of claim 1 where the connection mechanism is a slide configured to permit sliding movement of the first and second housing assemblies from the open position to the closed position.

7. The portable electronic device of claim 6 wherein when the portable electronic device is in at least the closed position, the touch surfaces of the first set of keys and the at least one second key in combination with the first and second housing assemblies are configured to hinder movement of at least one of the first or second housing assemblies when an external force is applied to the portable electronic device at an angle substantially perpendicular to a direction of movement permitted by the slide.

8. The portable electronic device of claim 1 wherein the keys comprising the first set and the at least one second key have cross-sectional heights, the cross-sectional heights of the first set of keys greater than the cross-sectional height of the at least one second key.

9. The portable electronic device of claim 1 wherein the keys comprising the first set and the at least one second key have cross-sectional heights, the cross-sectional heights of the first set and the at least one second key being substantially the same, the at least one second key displaced inward in comparison with the keys comprising the first set, so that the touch surfaces of the first set of keys extend above the touch surface of the at least one second key.

10. The portable electronic device of claim 3 wherein when the portable electronic device is in a closed position, the touch surfaces of the keys comprising the first set face the display surface and the touch surface of the at least one second key faces the display surround.

11. The portable electronic device of claim 10 wherein when the portable electronic device is in a closed position there is a first gap between the touch surfaces of the first set of keys and the display surface, and a second gap between the touch surface of the at least one second key and the display surround, wherein the first gap is less than the second gap.

12. The portable electronic device of claim 1 wherein the portable electronic device is a communicator.

13. The portable electronic device of claim 1 wherein the portable electronic device is a wireless telephone.

14. The portable electronic device of claim 1 wherein the portable electronic device is a personal digital assistant.

15. The portable electronic device of claim 1 wherein the portable electronic device is a notebook computer.

16. The portable electronic device of claim 1 wherein the portable electronic device is a media playback device.

17. The portable electronic device of claim 1 wherein when the portable electronic device is in a partially closed position, the touch surfaces of the first set of keys and the at least one second key in combination with the first and second housing assemblies are configured to hinder movement of at least one of the first or second housing assemblies when an external force is applied to the portable electronic device.

18. A portable electronic device comprising:
a first housing assembly comprising at least a display and a display surround, the display and display surround each having surfaces, the surface of the display displaced inward from the surface of the display surround forming a display recess;
a second housing assembly comprising at least a keyboard, the keyboard comprising a first set of keys and a second set of keys, the keys comprising the first and second set of keys each having touch surfaces configured to receive keystrokes, the touch surfaces of the first set of keys extending above the touch surfaces of the second set of keys;
a hinge connecting the first housing assembly and the second housing assembly, the hinge configured to permit relative movement between the first and second housing assemblies from at least an open position to a closed position; and
wherein when the portable electronic device is in at least the closed position the first and second sets of keys in combination with the first and second housing assemblies are configured to hinder movement of at least one of the first and second housing assemblies when an external force is applied to the portable electronic device.

19. The portable electronic device of claim 18 wherein when the portable electronic device is in the closed position, the first and second sets of keys in combination with the first and second housing assemblies are further configured to prevent twisting relative movement between the first and second housing assemblies when the external force is applied to the portable electronic device.

20. The portable electronic device of claim 18 wherein the keys comprising the first and second sets of keys have cross-sectional heights, the cross-sectional heights of the first set of keys greater than the cross-sectional heights of the second set of keys.

21. The portable electronic device of claim 18 wherein when the portable electronic device is in a closed position, the touch surfaces of the first set of keys directly face the display, the touch surfaces of the first set of keys directly facing the display extending into the display recess.

22. The portable electronic device of claim 21 wherein when the portable electronic device is in the closed position, the touch surfaces of the second set of keys directly face the display surround.

23. The portable electronic device of claim 22 wherein when the portable electronic device is in the closed position there is a first gap between the touch surfaces of the first set of keys and the display, and a second gap between the second set of keys and the display surround, wherein the first set of keys and the second set of keys are configured so that the first gap is less than the second gap.

24. The portable electronic device of claim 22 wherein when the portable electronic device is in a closed position the first set of keys that directly face the display and the second set of keys that directly face the display surround are configured so that upon application of an external force to at least one of the first housing assembly and the second housing assembly the touch surfaces of the first set of keys engage and support the display preventing the touch surfaces of the second set of keys directly facing the display surround from engaging the display surround first and applying an initial force at an edge of the display.

25. The portable electronic device of claim 18, wherein the portable electronic device is a notebook computer.

26. The portable electronic device of claim 18, wherein the portable electronic device is a wireless telephone.

27. The portable electronic device of claim 18, where the portable electronic device is a personal digital assistant.

28. The portable electronic device of claim 18 wherein when the portable electronic device is in a partially closed position, the touch surfaces of the first and second sets of keys in combination with the first and second housing assemblies are configured to hinder movement of at least one of the first or second housing assemblies when an external force is applied to the portable electronic device.

29. A portable electronic device comprising:
- a first housing assembly;
- a second housing assembly comprising at least a keyboard, the keyboard comprising a first set of keys and a second set of keys, the keys comprising the first and second set of keys each having touch surfaces configured to receive keystrokes, the touch surfaces of the first set of keys extending above the touch surfaces of the second set of keys;
- a slide connecting the first housing assembly and the second housing assembly, the slide configured to permit sliding relative movement between the first housing assembly and the second housing assembly from at least an open position to a closed position; and
- wherein when the portable electronic device is in at least the closed position the first and second sets of keys in combination with the first and second housing assemblies are configured to hinder movement of at least one of the first and second housing assemblies when an external force is applied to the portable electronic device.

30. The portable electronic device of claim 29 wherein when the portable electronic device is in the closed position, the first and second sets of keys in combination with the first and second housing assemblies are further configured to prevent twisting relative movement between the first and second housing assemblies.

31. The portable electronic device of claim 29 wherein the keys comprising the first and second sets of keys have cross-sectional heights, the cross-sectional heights of the first set of keys greater than the cross-sectional heights of the second set of keys.

32. The portable electronic device of claim 29 where the first housing assembly further comprises a first structure and a second structure, the first structure and the second structure each having surfaces, wherein when the portable electronic device is in the closed position, the touch surfaces of the first set of keys directly face the surface of the first structure, and the touch surfaces of the second set of keys directly face the surface of the second structure, and further when the portable electronic device is in the closed position there being a first gap between the first set of keys and the surface of the first structure and a second gap between the second set of keys and the surface of the second structure, the first gap less than the second gap.

33. The portable electronic device of claim 32 wherein when the portable electronic device is in the closed position the first set of keys that directly face the surface of the first structure and the second set of keys that directly face the surface of the second structure are configured so that upon application of the external force to at least one of the first housing assembly and the second housing assembly the touch surfaces of the first set of keys engage and support the surface of the first structure preventing the touch surfaces of the second set of keys from engaging the surface of the second structure first and applying a twisting force the portable electronic device.

34. The portable electronic device of claim 29, wherein the portable electronic device is a media playback device.

35. The portable electronic device of claim 29, wherein the portable electronic device is a wireless telephone.

36. The portable electronic device of claim 29, wherein the portable electronic device is a personal digital assistant.

37. The portable electronic device of claim 29 wherein when the portable electronic device is in a partially closed position, the touch surfaces of the first and second sets of keys in combination with the first and second housing assemblies are configured to hinder movement of at least one of the first or second housing assemblies when an external force is applied to the portable electronic device.

38. A portable electronic device comprising:
- a first housing assembly comprising at least a display and a display surround;
- a second housing assembly comprising at least a keyboard, the keyboard comprising a first set of keys and a second set of keys, the first and second sets of keys having touch surfaces adapted to receive keystrokes;
- a hinge connecting the first housing assembly and the second housing assembly, the hinge configured to permit relative motion between the first and second housing assemblies from at least an open position to a closed position; and
- wherein when the portable electronic device is in at least the closed position the touch surfaces of the first set of keys directly face the display and the touch surfaces of the second set of keys directly face the display surround, the touch surfaces of the first set of keys directly facing the display displaced a first distance from the display and the touch surfaces of the second set of keys directly facing the display surround displaced a second distance from the display surround, the first distance less than the second distance, and wherein the first and second sets of keys and the first and second housings are configured to hinder movement of at least one of the first and second housings when an external force is applied to the portable electronic device.

39. The portable electronic device of claim 38 wherein the keys comprising the first and second sets of key have cross-sectional heights, the cross-sectional heights of the first set of keys greater than the cross-sectional heights of the second set of keys.

40. The portable electronic device of claim 38 wherein both the first set of keys that directly face the display and the second set of keys that directly face the display surround when the portable electronic device is in a closed position are configured so that upon application of an external force to at least one of the first housing assembly and the second housing assembly the touch surfaces of the first set of keys engage and support the display preventing the touch surfaces of the second set of keys directly facing the display surround from engaging the display surround first and applying an initial force at an edge of the display.

* * * * *